Patented Oct. 11, 1932

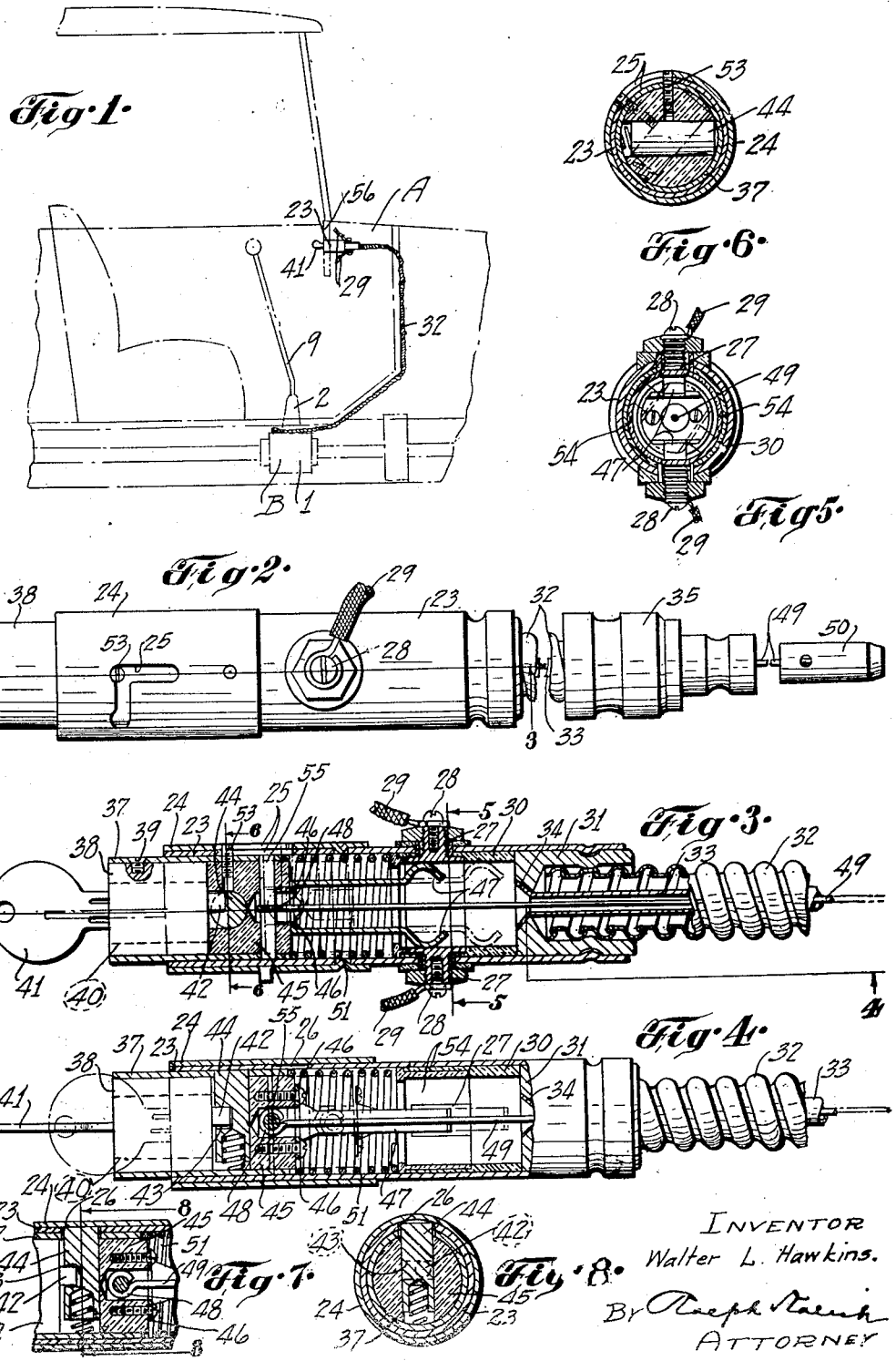

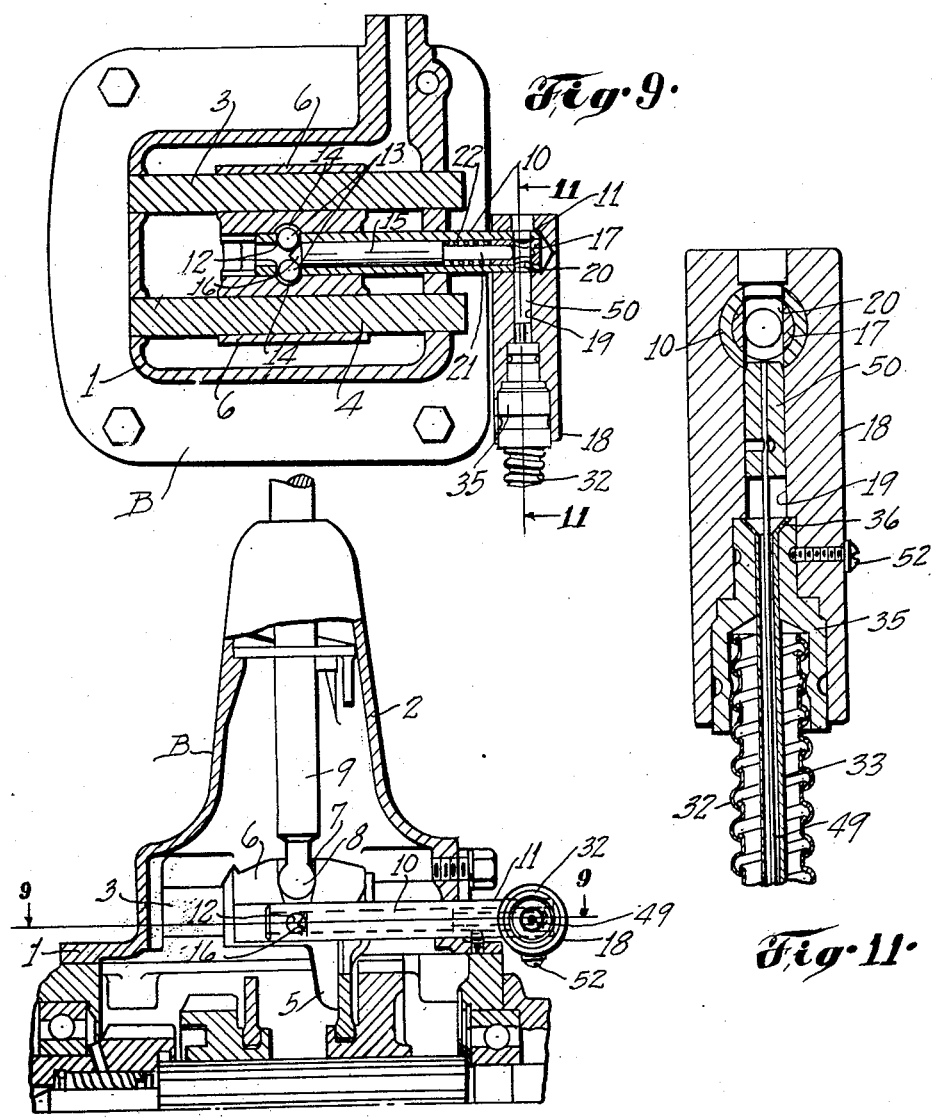

1,881,552

UNITED STATES PATENT OFFICE

WALTER L. HAWKINS, OF ST. LOUIS, MISSOURI, ASSIGNOR, BY MESNE ASSIGNMENTS, TO FRANK C. WEBB, OF ST. LOUIS, MISSOURI

AUTOMOBILE LOCK

Application filed August 20, 1928. Serial No. 300,799.

This invention relates to a certain new and useful improvement in automobile locks. My present invention has for its object the provision of an economically constructed, readily installed, compact, durable, and conveniently actuatable device for efficiently locking both the ignition and transmission of the automobile so as to effectively prevent unauthorized use thereof.

And with the above and other objects in view, my invention resides in the novel features of form, construction, arrangement, and combination of parts hereinafter described and pointed out in the claims.

In the accompanying drawings (two sheets),—

Figure 1 is a fragmental elevation in outline of an automobile equipped with a lock embodying my invention;

Figure 2 is a broken elevational view of the lock;

Figure 3 is a longitudinal sectional view of the lock, taken approximately on the line 3—3, Figure 2, the parts of the lock being shown in full lines in normal or transmission unlocking and ignition completing (unlocking) position;

Figure 4 is a similar view of the lock, taken approximately on the line 4—4, Figure 3;

Figures 5 and 6 are transverse sectional views of the lock taken, respectively, on the lines 5—5 and 6—6, Figure 3;

Figure 7 is a fragmental longitudinal sectional view of the lock;

Figure 8 is a transverse section taken approximately on the line 8—8, Figure 7;

Figure 9 is a transverse sectional view of the automobile transmission, taken approximately on the line 9—9, Figure 10;

Figure 10 is an elevational view, partly broken away and in section, of the automobile transmission; and Figure 11 is an enlarged sectional view taken approximately on the line 11—11, Figure 9.

Referring now more in detail and by reference characters to the drawings, which illustrate a preferred embodiment of my invention, A designates an automobile of standard construction, which is equipped with a transmission B, generally also of standard construction. For present purposes, transmission B, which is of the sliding gear type, may be described as including a suitable casing 1 provided with a cap or dome 2, which closes the upper side of the casing 1. Mounted in the casing 1, are two fixed parallel guides 3 and 4. Engageable for actuation with the several respective gears of the transmission, are forked arms 5, each provided with a head 6 through which the guides 3, 4, extend and upon which they are disposed for slidable movement longitudinally. The heads or shifting members 6 are formed with adjacent flat sides, which are notched or cut-away, as at 7, to receive a head 8 upon the lower end a shifting-lever 9, which latter extends upwardly through the upper end of the dome 2. Normally, as when the car is at a standstill, the lever 9 is in neutral position, with the arms 5 out of engaging relation with the transmission gears; however, as will be well understood, as the lever 9 is selectively shifted to one or the other of its respective positions, the gears of the transmission will be correspondingly shifted and the desired speed or reverse obtained.

Now, such standard transmission B is equipped, as part of my invention, with a fixed sleeve or barrel 10 disposed for the greater portion of its length intermediate the shifting-members 6, as best seen in Figure 9, barrel 10 at its rear end 11 projecting exteriorly the casing 1, for purposes shortly appearing; and formed in barrel 10 adjacent its opposite or forward end are preferably diametrically opposite registering apertures 12, 12, for accommodating a pair of locking dogs preferably in the form of balls or spheres 13, 13, having respective seats, as at 14, 14, in the respective shifting members 6. Fitting for longitudinal movement in the barrel 10, is a suitably elongated plunger 15, which is disposed wholly rearwardly or to one side of the dogs 13 and is adapted for co-operation therewith at its forward, preferably pointed or conical end 16. Suitably fixed within the sleeve or barrel 10 at its said projecting end 11, is an abutment cup 17, and suitably fixed on said end 11 of the sleeve 10, is a housing 18 having a longitudinal bore 19, with which bore a through aperture 20 formed in the sleeve 10 and its housed cup 17 permanently registers. The plunger 15 is formed at its rear end with a reduced extension 21, coiled on which and abutting against the rim of cup 17 and the correspondingly shouldered end-face of the body of plunger 15, as best seen in Figure 9, is a spring 22, under the tension of which the plunger 15 is yieldingly held or retained in normal engagement at its conical end 16 with the dogs 13. I may here add that the aggregate length of the plunger 15 and its tail-extension 21 is such that, when the plunger 15 is in such normal engagement with the dogs 13, the extension 21 registers at its free end approximately with the front wall of said through aperture 20. Normally, therefore, the plunger 15 is shiftable in the sleeve 10 against the tension of the spring 22, so that, as the lever 9 is selectively shifted in one or the other direction to correspondingly shift one or the other of the heads 6, one or the other of the dogs 13 is permitted in co-operation with the conical end 16 of plunger 15, to move inwardly of the sleeve 10 and out of its seat 14, the respective head 6 being hence free for shiftable movement.

However, if and when the plunger 15 is retained against shiftable movement in the sleeve 10, the dogs 13 will be prevented or held from so moving from their seats 14 and the heads 6 will consequently be retained against shiftable movement in any attempted manipulations of the shifting lever 9.

23 designates a suitably elongated preferably cylindrical rigid shell or casing, suitably conjoined or otherwise permanently fixed to which at its forward end, is a correspondingly shaped enclosing rigid shell-member or section 24. For purposes soon to appear, the shell 23 and its conjoined section 24 are provided with registering bayonet-shaped slots 25, the shell 23 having an additional aperture 26 circumferentially spaced from the slots 25 and wholly concealed by the enclosing section 24, as best seen in Figures 4 and 7. Intermediate its ends, the shell 23 is equipped with suitable preferably diametrically opposite electrical terminals 27, 27, which are mounted in, and insulated from, the wall of the shell 23, as best seen in Figures 2, 3, and 5, the terminals 27 being circumferentially spaced interiorly of the shell by fixed insulation-pieces 54 and each terminal 27 having a binding-post 28 for engagement electrically with the respective conductors 29, 29, of the battery circuit of the automobile.

Fixed interiorly within the shell 23 immediately rearward of the terminals 27, is an insulation ring 30, and also fixed within the shell 23 at its rear end, is a plug 31, suitably conjoined or otherwise permanently fixed to which is one end of a suitably elongated preferably armored flexible housing 32 enclosing and protecting throughout its length a flexible tube 33, whose one end is fixed, as at 34, in the plug 31, as best seen in Figure 3. Conjoined or otherwise permanently fixed upon the other end of the housing 32, is a preferably rigid tip 35, through which the tube 33 extends and to which the other end of the tube 33 is fixed, as at 36, as best seen in Figure 11.

Disposed for slidable reciprocation in the shell 23 at its forward end, is a third tubular section 37 snugly at its forward end encircling a correspondingly shaped lock-block 38, the latter being pinned or secured to the shiftable-section 37 as by means of a screw or the like 39. Mounted in the block 38, is a lock cylinder 40 adapted only for rotatory actuation, as is customary in such locks, by means of a particular key 41 insertable into the cylinder 40. Forming part of the cylinder 40 and projecting from the rear end thereof, is a longitudinally disposed and axially offset crank-pin 42 adapted to fit and work in a recess 43 provided in a spring-pressed bolt 44 disposed transversely of the shell 23, as best seen in Figures 4, 6, 7, and 8, and retained operatively in co-operation with the pin 42 as by means of a suitably formed insulation block 45 fixed, as by means of a cross-pin 55 to, and disposed in the rear end of, the shiftable section 37.

Suitably fixed at one end, as at 46, 46, to and upon the rear face of block 45 and rearwardly projecting longitudinally within the shell 23, are suitably spaced somewhat spring contact-fingers 47, 47, and also attached at one end, as at 48, to the block 45, is a preferably continuous rod or shaft 49 preferably constructed of flexible wire of suitable cross-section, which extends longitudinally through the tube 33 and its tip 35, rod 49 at its free end projecting outwardly from the tip 35 and permanently carrying a transmission-engaging pin 50.

Abutting within shell 23 against the rearward end of the lock-section 37 and the forward margin of the terminals 27, is a coiled spring 51 adapted to yieldingly retain the section 37 and its attached lock-cylinder 40, bolt 44, contact-fingers 47, and rod 49 and its carried pin 50 in forwardly projected or normal position relatively to the shell 23 or in the relative positions thereof illustrated in Figures 4 and 11 and in full lines in Figure 3.

In use and operation, the shell 23 is suitably mounted and fixed in the instrument-board 56 of the automobile A, and the housing 32 suitably flexed and manipulated to dispose its tip 35 within the co-operating fixed housing 18 provided on the transmission B, to which housing 18 said tip 35 is secured as by means of a screw 52, all as best seen in Figures 1, 9, 10, and 11.

Projecting radially from the lock-carrying section 37, is a suitable pin 53, which fits and works in the registering bayonet-slots 25 for limiting both the endwise or longitudinal and rotatory movements of the tubular-section 37 and its attached parts.

Now, it will be seen that, when the lock-carrying shiftable section 37 is in its said normal position and the pin 53 disposed at the forward end of the longitudinal portion of the slots 25, the bolt 44 is retracted and out of registering relation with the aperture 26, the contact-fingers 47 are in electrical engagement with the terminals 27, and the locking-pin 50 is retracted from and out of the aperture 20. Consequently, the ignition circuit of the automobile is complete, the shifting-members 6 may be actuated to the desired gear-engaging position, and the automobile may be driven. However, a key 41 being now in the cylinder 40 and the cylinder 40 and its attached embracing shiftable section 37 being forced rearwardly against the tension of spring 51, the bolt 44 will be shifted into registering relation with the slot 26, the contact-fingers 47 will be shifted out of electrical engagement with the terminals 27 and into engagement with the insulation ring 30, and the pin 50 will be shifted to reside in said aperture 20 and thereby retain the plunger 15 against actuation. On key 41 being now manipulated to rotatably actuate the barrel 40 and its pin 42, the bolt 44 will be shifted to fit and engage at an end in the slot 26, and the several parts thus locked in their described so-called abnormal position, when the transmission B can not be manipulated and co-incidentally the ignition circuit of the car is broken.

I may add that the lock-cylinder 40 is of such standard type that the key 41 can only be removed when the bolt 44 is in its said abnormal position, in locking engagement with the fixed rigid shell or casing 23, and that further, when the lock-carrying section 37 is an abnormal or locking position, the forward or exposed face of the lock-block 38 is approximately flush with the forward end of the shell 23, the securing-screw 39 being then wholly concealed and inaccessible.

Frequently, however, a car operator, on making, for example, a short stop, desires merely to turn off the ignition, without locking his car. The parts being in unlocked or normal position, this is readily accomplished by axially turning the section 37 through approximately fifty degrees, permitted by the transverse or circumferential portion of the slots 25, which movement correspondingly shifts the contact-fingers 47 from the terminals 27 and on to the intermediate insulation pieces 54, the ignition being again completed on reverse rotatory actuation of the section 37.

Thus I provide an automobile lock of so-called co-incidental type, which meets all requirements, and which fully accomplishes the objects stated.

It is to be understood that changes in the form, construction, arrangement, and combination of the several parts of my new lock may be made and substituted for those herein shown and described without departing from the nature and principle of my invention.

Having thus described my invention, what I claim and desire to secure by Letters Patent is:

1. In an automobile lock, in combination, transmission gear shifting members, dogs normally having seated engagement with said members for releasably retaining the same against movement, a fixed sleeve having a diametrically disposed aperture, a plunger shiftable in the sleeve and normally having spring-pressed engagement at an end with the dogs for releasably retaining the same in seated engagement with said members, and means including a shiftable pin adapted for projection into said aperture for engagement with the plunger for retaining the same against movement in engagement with the dogs.

2. In an automobile lock, in combination, transmission gear shifting members, dogs normally having seated engagement with said members for releasably retaining the same against movement, a fixed sleeve having a diametrically disposed aperture, a plunger shiftable in the sleeve, a spring within the sleeve for retaining the plunger yieldingly in engagement with the dogs for retaining the same in their seats, and means including a shiftable pin adapted for projection into said aperture for engagement with the plunger for retaining the same against movement in engagement with the dogs.

3. In an automobile lock, in combination, transmission gear shifting members, dogs normally having seated engagement with said members for releasably retaining the same against movement, a fixed sleeve having a diametrically disposed aperture, a plunger shiftable in the sleeve, an abutment in the sleeve, a reduced extension on the plunger, a spring coiled on said extension and having abutting relation with the plunger and with said abutment for yieldingly retaining the plunger in engagement with the dogs, and means including a shiftable pin adapted for projection into said aperture for engagement with the plunger for retaining the same against movement in engagement with the dogs.

In testimony whereof, I have signed my name to this specification.

WALTER L. HAWKINS.